大專利 Office 3,143,440
Patented Aug. 4, 1964

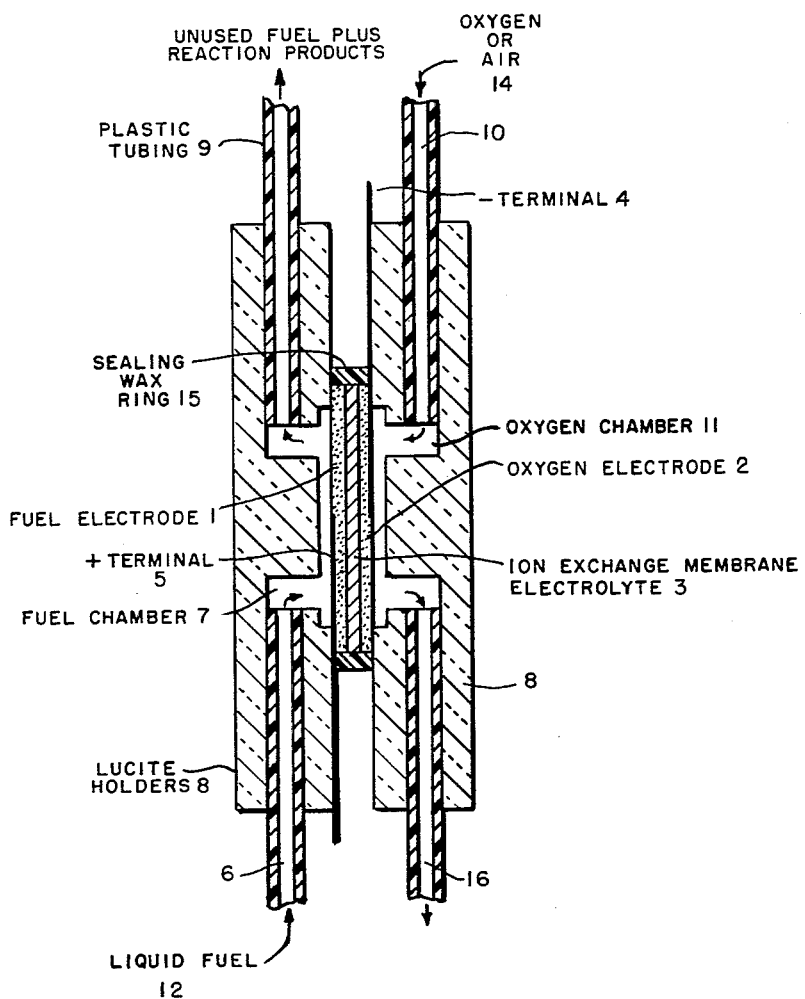

3,143,440
FUEL CELL
Herbert Hunger, Long Branch, and James E. Wynn, Neptune, N.J., assignors to the United States of America as represented by the Secretary of the Army
Filed Aug. 4, 1960, Ser. No. 47,568
3 Claims. (Cl. 136—86)
(Granted under Title 35, U.S. Code (1952), sec. 266)

The invention described herein may be manufactured and used by or for the Government for governmental purposes without the payment of any royalty thereon.

This invention relates to fuel cells having a solvated anion exchange resin as the electrolyte.

Fuel cells have been defined as electrochemical devices in which part of the energy derived from a chemical reaction maintained by the continuous supply of chemical reactants, is converted to electrical energy.

It has been known to provide a fuel cell with a solvated ion exchange resin membrane as the electrolyte, positioned between the two electrodes, and to supply a gaseous fuel to one of the electrodes and an oxidant to the other electrode. Both anion and cation exchange resins have been used for this purpose.

It has also been known to construct a fuel cell having a liquid electrolyte for the adsorption and de-adsorption of ions of fuel and oxygen respectively, in which a liquid water soluble fuel is dissolved in the electrolyte and the mixture supplied to one of the electrodes while an oxidizing gas is passed to the other oxygen electrode.

Attempts of using liquid fuels in fuel cells having a solvated ion exchange resin membrane as the electrolyte have been unsuccessful since the resulting cells show rather low efficiency. We now have found that fuel cells having a solvated anion exchange resin membrane as the electrolyte gives high efficiency if the liquid fuel consists of a mixture of an electrochemically oxidizable, liquid organic compound with an inorganic compound that consists of either an inorganic hydroxide, carbonate or bicarbonate. The invention is based on the discovery that the oxygen electrode in a cell having an anion exchange resin membrane does not yield sufficient hydroxyl ions to make the oxidation of the fuel at the fuel electrodes complete. By adding adequate amounts of inorganic hydroxides, carbonates or bicarbonates, there are provided the necessary rest hydroxyl ions to make the oxidation of the liquid fuel complete. If inorganic hydroxides are used that do not produce sufficient hydroxyl ions in non-aqueous media, water is added to provide the necessary medium for dissociation.

The invention will be illustrated in connection with a fuel cell, a sectional view of which is shown in the drawing.

The cell of the drawing comprises a disc-shaped fuel electrode 1 and an equally disc-shaped oxygen electrode 2 separated by a solvated anion exchange membrane 3 which is in electrical contact with the electrodes 1 and 2. Membrane 3 constitutes the electrolyte of this fuel cell. The negative terminal 4 is connected to the oxygen electrode 2 and the positive terminal 5 to the negative fuel electrode 1. The liquid fuel 12 is supplied thru the plastic tubing 6 into the fuel chamber 7 which is provided in the Lucite holders 8. After being at least partly used up the unused fuel portion plus the reaction products are forced to flow thru the plastic tubing 9. The gaseous oxygen or air 14 are introduced thru the tubing 10 into the oxygen chamber 11 and the unused oxygen plus the reaction products are removed thru the tubing 16. A wax ring 15 provides a hermetic seal which prevents the escape of gases and liquids from the disc-shaped cell which is constituted by the two disc-shaped electrodes 1 and 2 separated by the equally disc-shaped anion exchange resin membrane 3 acting as the electrolyte.

The anion exchange resin from which the membrane 3 is made may be produced in various ways, for instance, as described in the literature cited in U.S. Patent No. 2,913,-511. Such anion exchange resins may be made by attaching an ionizable group to a polymeric compound such as the polymers of phenol-formaldehyde, the polymers of urea or melamine with formaldehyde or similar resins.

Any appropriate method of making the anion exchange resin membranes may be used. The granulated anion exchange resins may be incorporated into a suitable binder such as polyethylene and made into sheet-like discs or the anion exchange resin itself may be formed into a membrane structure either by molding or casting a partially polymerized resin in membrane form.

Any appropriate type of electrodes may be used in this cell. Suitable electrodes are, for instance, the well-known, highly porous nickel or carbon electrodes provided with platinum black as catalyst. Other electrodic or catalytic materials such as palladium, iridium may be used.

The following examples are illustrative of the broad inventive idea:

*Example 1*

A fuel mixture in the mol ratio of 1 mol methanol to 1 mol of potassium hydroxide is prepared by mixing 40.4 ml. of methanol with 71 ml. of a concentrated aqueous potassium hydroxide solution which has been saturated with potassium hydroxide at 25° C. The tank (not shown in the drawing) containing this fuel mixture is positioned slightly above the fuel cell and the continuous or intermittent gravity flow of the fuel from the tank into the fuel cell is regulated by a valve preferably a so-called "Teflon" needle valve. Filling the fuel chamber 7 once with a fresh fuel mixture is sufficient to maintain the operation of the cell at maximum power output over a period of one day. A small drop in cell potential (in the region of milli volts) is observed during this time but the original potential is immediately restored and remains at the same level if only a very small flow of the fuel mixture thru the cell is being permitted. Approximately 0.01 ml. per minute is sufficient to restore immediately the original potential.

The potential of the cell at maximum output is between 0.4 and 0.5 volt. The current density obtainable depends upon the electrode carrier structure and also upon the kind of structure and amount of catalyst attached to the carrier. With porous nickel as the carrier and platinum as the catalyst current densities of about 2 ma. per cm.$^2$ are obtained if the catalyst is used in a concentration of about 1 mg. platinum per cm.$^2$ geometrical electrode area. With carbon carriers instead of the nickel carrier and using the same amount of platinum catalyst the current density may be increased to 10 ma. per cm.$^2$ at the above given potential of 0.4 to 0.5 volt. The open current voltage of this system is between about 0.8 and 0.95 volt depending upon the age of the oxygen electrode.

We have found that wet-proofing the oxygen electrode with, for instance, paraffin or polyethylene increases the operational life of the cell considerably. Without wet-proofing breakdown of the cell potential at maximum load may occur already during the first day of operation. Wet-proofing prolongs the life-time of the cell up to a period of two months.

*Example 2*

An aqueous solution of formaldehyde containing 37.1% of formaldehyde was mixed with potassium hydroxide in the molar ratio of 2 mols of formaldehyde, 1 to 2 mols of potassium hydroxide. An exothermic reaction ensues and the mixture heats itself to the boiling point. After cooling a fuel mixture was obtained containing methanol, formaldehyde and potassium formate as active fuel components. This mixture was introduced into the fuel cell as described in Example 1. With porous, nickel electrodes and platinum black catalysts current densities of 1.3 ma. per cm.$^2$ were obtained at a potential of 0.345 volt.

*Example 3*

Instead of using methanol and potassium hydroxide as described in Example 1 ethanol and sodium hydroxides were used yielding similar results.

*Example 4*

Instead of methanol as described in Example 1 acetone was used yielding similar results.

*Example 5*

Instead of potassium or sodium hydroxide as the inorganic compound as described in Examples 1 and 3 sodium or potassium carbonates and bicarbonates have been used. If other less soluble carbonates are used it will be necessary to add water to the mixture of the organic fuel and the inorganic compound in order to provide a medium for the dissociation of those inorganic compounds that do not produce sufficient hydroxyl ions in a non-aqueous medium.

It will be obvious to those skilled in the art that various other organic compounds as those described in the above examples may be used as fuels within the process of this invention. For instance, various hydroxy acids, fatty acids, salts of fatty acids, ketonic acids and other mono or poly basic acids may be used. The larger the molecule of these organic compounds to be used in the fuel mixture of the present invention the lower will be the current densities, other conditions remaining the same.

What is claimed is:

1. A fuel cell for the direct production of electrical energy from a liquid fuel comprising a solvated anion exchange resin membrane as the sole electrolyte, said membrane being positioned between two gas permeable porous electrodes, means for applying a liquid fuel to the porous fuel electrode, said liquid fuel consisting of the exothermic reaction products of an aqueous solution of formaldehyde containing about 37% of formaldehyde with an aqueous solution of potassium hydroxide, said reaction product, after cooling consisting of a mixture of methanol, formaldehyde and potassium formate and means for supplying a gaseous oxidant to the other porous electrode.

2. A fuel cell according to claim 1 in which the formaldehyde is reacted with potassium hydroxide in the ratio of 2 mols of formaldehyde with 1 mol of potassium hydroxide.

3. A fuel cell according to claim 1 in which the formaldehyde is reacted with potassium hydroxide in the ratio of 1 mol of formaldehyde to 1 mol of potassium hydroxide.

References Cited in the file of this patent

UNITED STATES PATENTS

| | | |
|---|---|---|
| 2,384,463 | Gunn et al. | Sept. 11, 1945 |
| 2,913,511 | Grubb | Nov. 17, 1959 |
| 2,925,454 | Justi et al. | Feb. 16, 1960 |

OTHER REFERENCES

How To Make a Fuel Cell, Esso Research and Engineering Co., P.O. Box 45, Linden, New Jersey.

Noller: Chemistry of Organic Compounds, page 219, 2nd ed., 1957.